US007421772B2

(12) United States Patent
Gao et al.

(10) Patent No.: US 7,421,772 B2
(45) Date of Patent: Sep. 9, 2008

(54) RATCHETING DRIVER WITH PIVOTING PAWLS AND METHOD OF ARRANGING SAME

(75) Inventors: Hua Gao, Fox Point, WI (US); James A. Rinner, Racine, WI (US)

(73) Assignee: Teleflex Medical Incorporated, Limerick, PA (US)

( * ) Notice: Subject to any disclaimer, the term of this patent is extended or adjusted under 35 U.S.C. 154(b) by 478 days.

(21) Appl. No.: 11/274,912

(22) Filed: Nov. 16, 2005

(65) Prior Publication Data

US 2006/0075621 A1 Apr. 13, 2006

Related U.S. Application Data

(62) Division of application No. 10/746,633, filed on Dec. 29, 2003, now Pat. No. 6,997,084.

(51) Int. Cl.
*B25B 13/46* (2006.01)
*B23P 11/00* (2006.01)

(52) U.S. Cl. ............................ 29/434; 29/464; 29/469; 81/58.4; 81/60; 81/61; 81/62; 81/63.1

(58) Field of Classification Search .................. 29/434, 29/464, 469; 81/58.4, 60–62, 63.1
See application file for complete search history.

(56) References Cited

U.S. PATENT DOCUMENTS

| | | | | |
|---|---|---|---|---|
| 110,901 | A | 1/1871 | Cowell | |
| 2,803,980 | A | 8/1957 | Vogel | |
| 5,537,899 | A | 7/1996 | Diedrich | |
| 5,613,585 | A * | 3/1997 | Tiede | 81/62 |
| 5,848,680 | A | 12/1998 | Rinner | |
| 5,943,755 | A | 8/1999 | Gauthier et al. | |
| 6,047,617 | A | 4/2000 | Chen | |
| 6,047,801 | A | 4/2000 | Liao | |
| 6,082,226 | A | 7/2000 | Lin | |
| 6,227,077 | B1 | 5/2001 | Chiang | |
| 6,349,619 | B1 | 2/2002 | Liao | |
| 6,543,315 | B2 | 4/2003 | Huang | |
| 6,658,970 | B2 | 12/2003 | Shiao | |
| 6,679,363 | B1 | 1/2004 | Marchant | |
| 6,817,458 | B1 | 11/2004 | Gauthier | |
| 7,137,320 | B2 * | 11/2006 | Tuan-Mu | 81/63.1 |

* cited by examiner

*Primary Examiner*—David P. Bryant
*Assistant Examiner*—Alexander P Taousakis
(74) *Attorney, Agent, or Firm*—Baker & Hostetler LLP

(57) ABSTRACT

A ratcheting driver for rotationally driving a piece and having a handle and pivotal pawls engageable with a driven gear and being capable of ratcheting and driving in both rotational directions. A cap is rotatable relative to said handle and it has a web for pivoting the pawls out of engagement with the gear. Through the selective rotation of the cap, the setting of the pawls is established. A spring positions the pawls in driving positions, and the cap has surfaces which disengage the pawls from the gear upon rotation of the cap. A method of arranging the driver is included.

7 Claims, 5 Drawing Sheets

RATCHETING DRIVER WITH PIVOTING PAWLS AND METHOD OF ARRANGING SAME

This is a division of application Ser. No. 10/746,633, filed Dec. 29, 2003, now U.S. Pat. No. 6,997,084. This invention relates to ratcheting drivers, and more particularly, it relates to ratcheting drivers which have pivotal pawls. The invention is particularly applicable to ratcheting screwdrivers and also where there are two pawls which are pivotal between the driving and released positions for respective rotation inducement and free ratcheting movement.

BACKGROUND OF THE INVENTION

Ratcheting drivers are already known in the art of applying fasteners, and in like actions. There can be a handle and an actuator thereon and a gear and pawl assembly all for maneuvering the actuator for selectively setting the assembly for rotational driving in either direction while allowing ratcheting in the direction opposite the driving direction.

The present invention improves upon the prior art drivers in that it presents a ratcheting driver which firmly transmits optimum amount of torque through the gear and pawl assembly. In accomplishing this objective, the driver of this invention is relatively easily manufactured, inexpensive, durable, and reliable.

In using a ratcheting driver, torque is applied from the user's hand to the handle and then to the pawl and then to the gear and then to the driven tool bit and/or to the work piece, such as a screw, nut, or bolt. It is important to have the assembly arranged for optimum transmission of the applied hand torque. That achievement is dependent on the construction, mounting, and location of the pawls. This invention achieves the optimum arrangement for transmitting that optimum torque, and doing so in a reliable and consistent manner.

This invention has pivotal pawls which are supported in pockets of the driver housing and, under the force of the rotation torque being applied, the pawls can not then pivot out of their engaged position with the gear. That is, the rotation force applied through the pawls serves to secure the pawls in the engaged position. There is a relationship between the housing and the pawls to effect the securement of the engaged pawls without any forces tending to tilt the pawl. The torquing force as applied to the pawls themselves serves to enhance security for the engagement of the teeth which will remain engaged while driving.

The pawls have a stability with the housing and the gear to always remain aligned therewith and thereby have full and aligned contact with the gear during maximum torque transmission. Also, in the driving mode, the forces on the pawls from the housing are in a direction to enhance the force of engagement of the pawl with the gear teeth to thereby remain in full and secure contact. In fact, there can be more than one angular direction of the forces from the housing to the pawl, and thus there can be two simultaneously applied forces from the housing to the engaged pawl. Those two forces are applied in spaced-apart locations, both of which urge the pawl into firm tooth engagement with the gear, as desired.

Another important feature is that the pawls are disengaged from the gear by a camming action applied by a control that slides under and over, in respective embodiments, the pivotal pawls for pivoting the pawls off the gear to thereby disengage the pawls. In that arrangement, the control is selectively moved to respective positions underneath the respective pawl to pivot the pawl off the gear. In that action, the control and the pawl have mutually engaging surfaces for effecting the pivoting action, and that produces the camming action. That is in contrast to the prior art of pushing pawls out of the way to free the pawls from gear engagement, and that means that those pawls were tenuously positioned in their engaged positions. In contrast, in the present invention the disengaging force on the pawl is in a direction of a force-component radially directed relative to the longitudinal axis of the gear.

In accomplishing the foregoing, in some of the herein disclosed embodiments, the pawls extend axially beyond the length of the gear teeth, and an actuator web is arranged for pivoting the pawl off the gear from underneath the pawl, that is, the web extends to a location radially inward on the pawl to lift the pawl off the gear. In another embodiment, the pawl does not extend axially beyond the gear teeth, and that pawl is pivoted off the gear teeth by a lever action on the pawl.

Several different embodiments of the cap, with respectively different integral webs, are disclosed, and, in all embodiments, no additional pawl actuator part is required to serve as a pawl actuator. All is with one integral cap with webs which pivot the respective pawls off the gear.

Additionally, inventiveness resides in utilizing the pawls for limiting the rotation of the cap when using the cap for ratcheting and driving adjustments. The pawls themselves are placed in rotative obstruction so the cap can not be rotated too far until the cap is intentionally released.

Still further, the gear is rotatably supported at its two ends which flank the gear teeth, so the tendency to cock or tilt the gear is eliminated because the gear is held stable against the driving forces. Also, the pawls extend beyond the axial length of the gear teeth, and thusly the webs which actuate by pivoting the pawls can contact the pawls from underneath at the extending lengths to lift the pawls for pivoting, rather than the need to push the pawls off to one side, as in some prior art.

There also is an inventive method of arranging the driver of this invention, and that is included herein. It is efficient and presents a sturdy driver.

DESCRIPTION OF THE EMBODIMENTS AND METHOD

Figures 1, 2, 3, 4, 5:
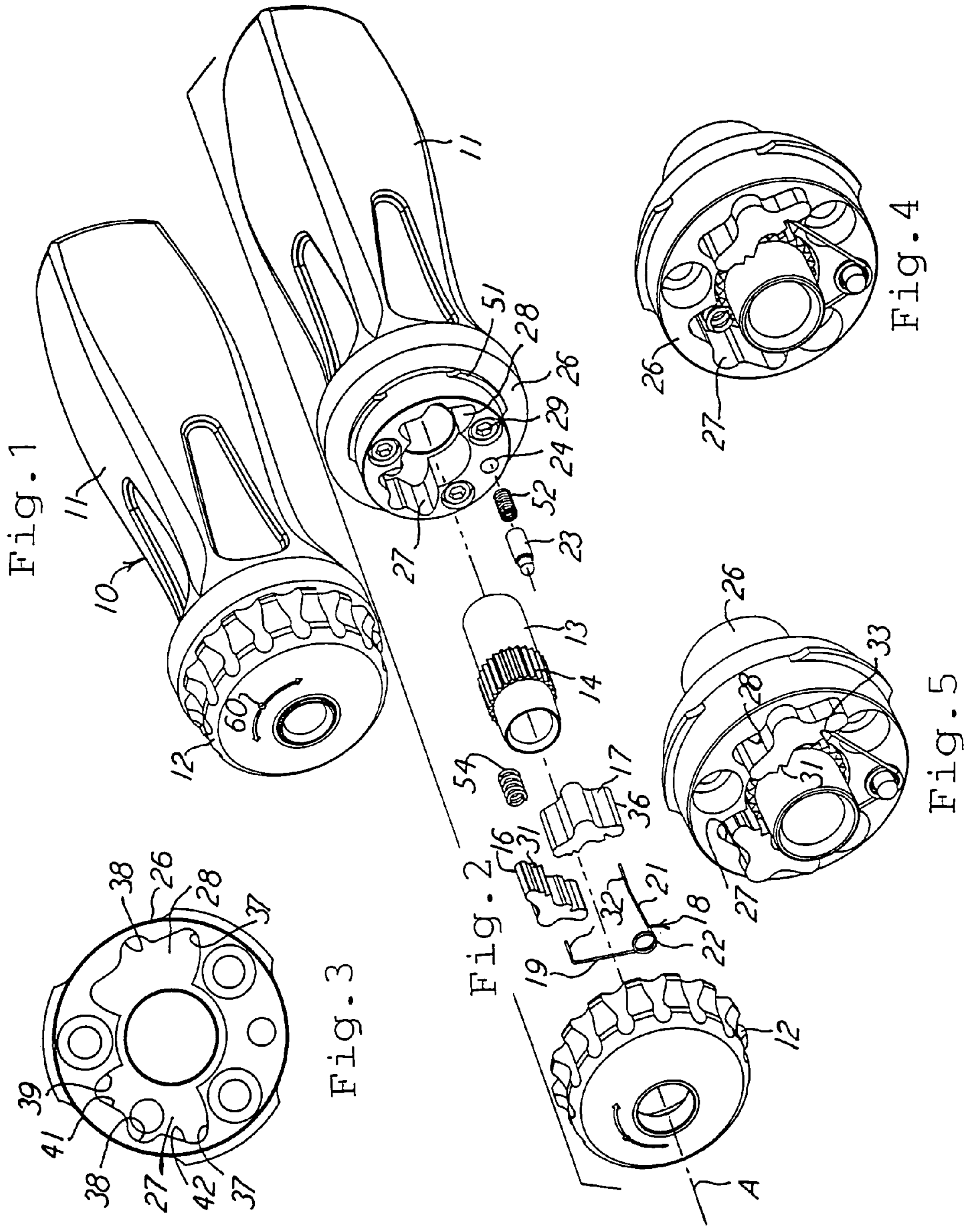
FIG. 1 is a front perspective view of one embodiment of the assembled driver of this invention.
FIG. 2 is an exploded view of the driver of FIG. 1.
FIG. 3 is a end elevation view of a handle part of FIG. 1.
FIG. 4 is a perspective view of a handle part of the assembly of FIG. 1.
FIG. 5 is a perspective view similar to FIG. 4 but with a pawl added thereto.

FIG. 1 shows the driver which incorporates this invention, and there is shown a screwdriver 10 having an elongated housing in the form of a handle 11 seen in FIGS. 1 and 2. FIG. 2 shows the screwdriver with the handle 11 and a cap 12, which serves as a pawl positioner, and the internal parts, all parts are oriented along the longitudinal axis A. There is a cylindrical gear member 13 which is snugly assembled with the handle 11 to be rotatable therein and it has gear teeth 14.

Figure 7:
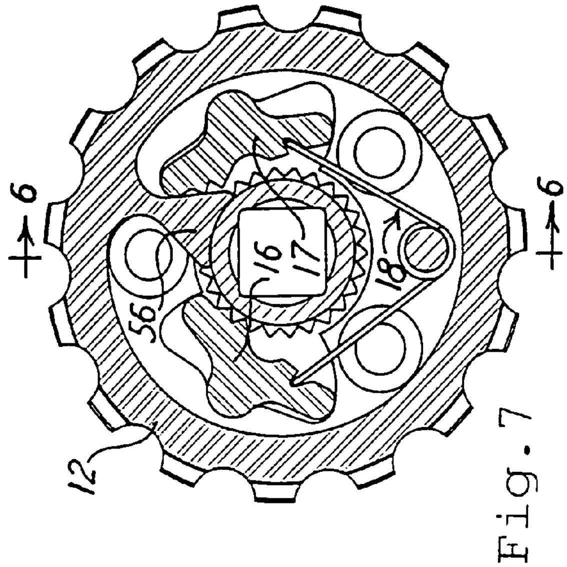
FIG. 7 is section view taken transverse of a view such as seen in FIG. 6 and substantially along a plane designated by a line 7-7 in FIG. 6, and showing one embodiment of the invention in the shown rotatable cap.
Figure 8:
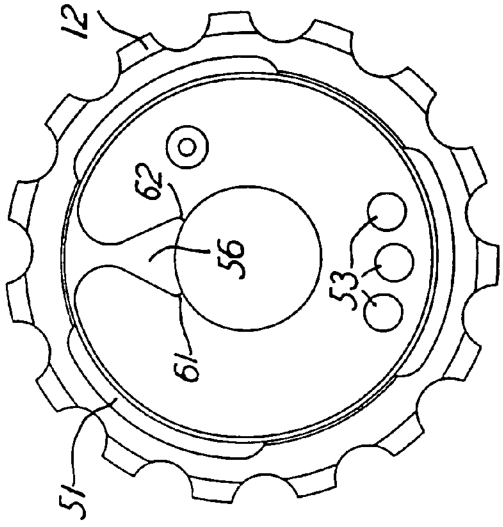
FIG. 8 is an end elevation view of a part seen in FIG. 7, but in a slightly different rotated position.
Figure 6:
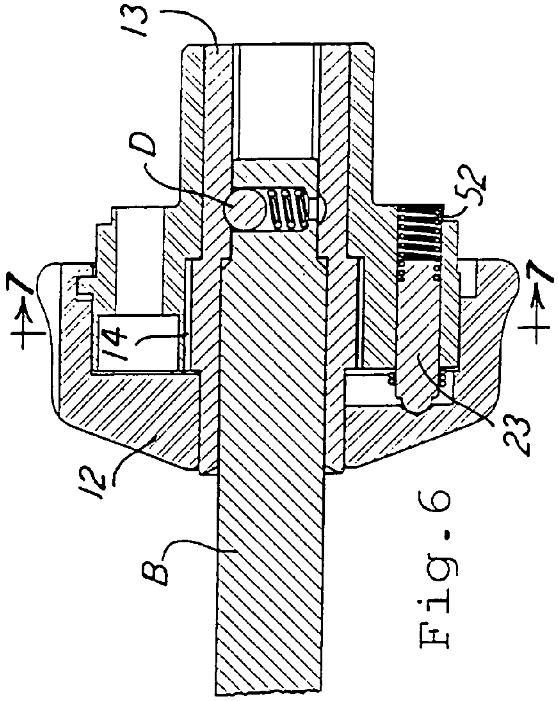
FIG. 6 is an enlarged section view, taken along the longitudinal axis, such as seen in FIG. 1, of parts of the assembly of FIG. 1, and with a fragment of a tool bit therein, and taken substantially along the plane designated by the line 6-6 of FIG. 7.

As shown in FIGS. 6 and 7, a bit B, such as a conventional screwdriver bit, can be inserted into the member 13 to rotate therewith by having a square mating drive therewith and there can be a ball detent D to hold the bit B. Or there can be an unshown arrangement for engaging a screw, nut, bolt, or the like, to rotationally drive that work piece, as usual, with an unshown adapter.

FIG. 2 also shows two pawls 16 and 17 and a pawl spring 18 which is V-shaped and has two legs 19 and 21 extending from a central helical portion 22 which is piloted and supported on a post 23 suitable disposed in an insert hole 24 and thereby be supported by the housing 11.

Sheet one of the drawings shows that the handle 11 supports a cylindrically shaped insert 26 which is suitable affixed with the handle 11, such as by being pressed therein, and which has two specially shaped pockets 27 and 28 for respective reception of the two pawls 16 and 17. FIG. 3 shows the shapes of the two pockets 27 and 28 which are in mirror image, and they are shown to be disposed substantially to the upper half of that end view of FIG. 3, that is, they are offset to that upper half. Insert 26 can be affixed to the handle 11 with screws 29 extending through insert 26 and into the handle 11. In this description and the claims, the insert 26 is included in the reference to the word handle.

Figure 20:
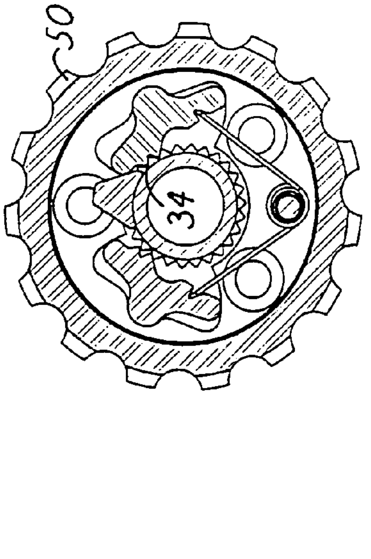
FIG. 20 is a section view of the cap of FIG. 19 and taken similar to that of FIG. 7, but including parts added thereto.

FIGS. 4 and 5 also show how the pawls 16 and 17 are assembled relative to the driver and the spring 18 is mounted on the post 23 and in contact with the pawls 16 and 17. The pawls 16 and 17 have teeth 31 which can drivingly engage the gear teeth 14, such as shown in FIGS. 5 and 20, and the spring 18 yieldingly urges the pawls into their respective gear teeth engaged positions.

Figure 12:
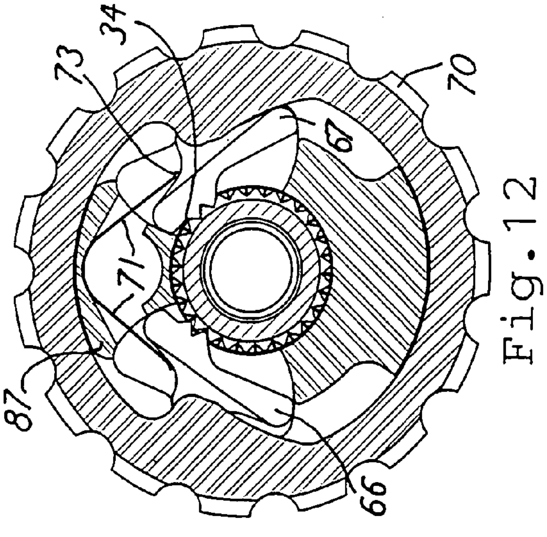
FIG. 12 is a section view taken similar to that of FIG. 7 and being of the embodiment of FIG. 11 with parts added thereto.

The spring 18 has two angled ends 32 which are received in slots 33 in each of the pawls 16 and 17, as seen in FIGS. 2, 5 and 7. The spring 18 is centrally coiled and presents extending ends 33 which are normally spring-urged away from each other and thereby urge radially outwardly on the pawls at their slots 33. The pawls 16 and 17 are pivotal into and out of tooth engagement with the gear teeth 14 under the urging of the spring 18 and another influence explained later herein. The pawls engage the gear teeth at the two respective locations designated 34 on the circumference of the gear teeth 14, as seen in FIGS. 12 and 20. It will also be seen that the pawls 16 and 17 extend along their axial length designation 36, in the direction of the axis A, substantially at the diameter of the gear teeth 14. Thus there is a substantial length of tooth contact between the gear teeth 14 and pawl teeth 31, and that length is substantially at the diameter of the tooth base circle of the gear teeth 14.

As seen in FIGS. 4 and 5, the teeth 31 of the pawls 16 and 17 extend beyond the axial extent of the gear teeth 14. Thus the pawls present an extension or overhang in their lengths, and, as explained later, there are two embodiments of webs or actuator surfaces which engage those overhangs for pivoting the pawls out of tooth engagement with the gear teeth 14.

Figure 22:
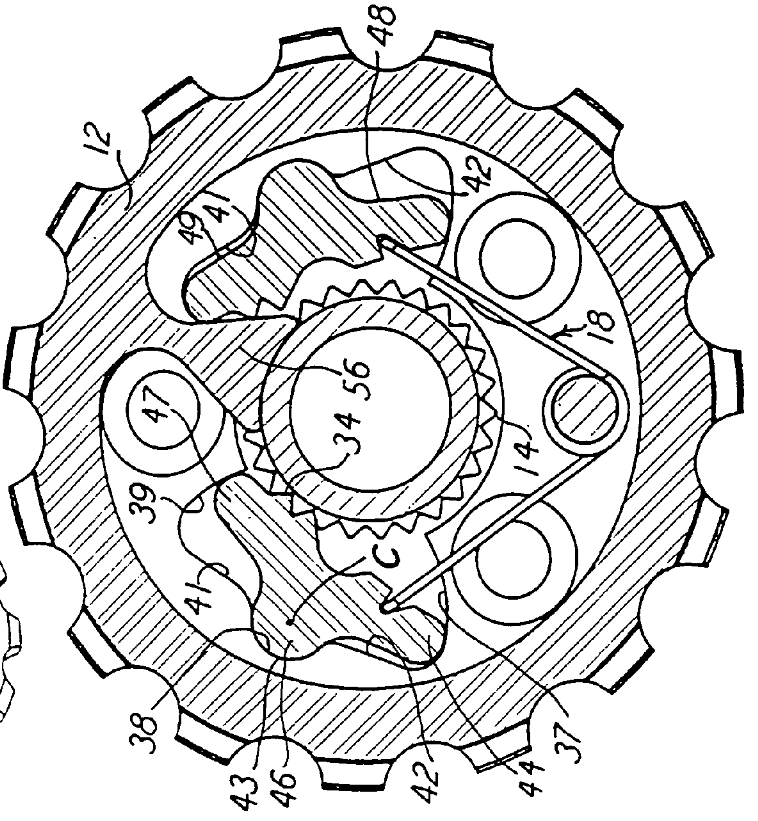
FIG. 22 is an enlarged view of FIG. 7 but with the bit removed.

As viewed along the axis A, the tooth engagement locations 34 are at the respective 10/11 o'clock and 1/2 o'clock locations, as seen in FIG. 12. The pawl pockets 27 and 28, as best seen in FIGS. 3 and 22, are defined in part by arcuate walls 37 and 38, both of which face the locations 34. The pockets 27 and 28 also have arcuate walls 39, and there are walls 41 and 42 in the formation of the pockets 27 and 28. An imaginary respective straight line between a point on each wall 37 and 38 and to the location 34 is substantially tangential to the gear teeth 14. Each pawl is shown to have at least two teeth disposed on the location 34 and engaged with two or three gear teeth 14.

Figure 9:
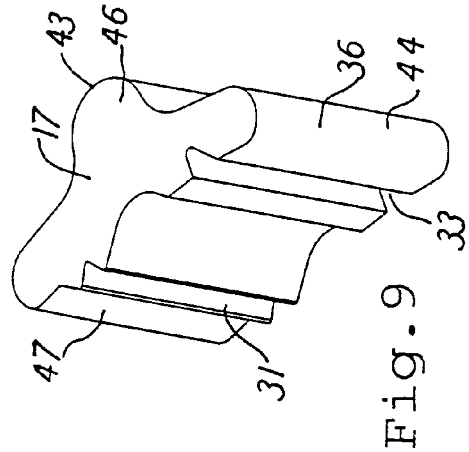
FIG. 9 is an enlarged perspective view of an embodiment of the pawl as seen in FIG. 2.
Figure 10:
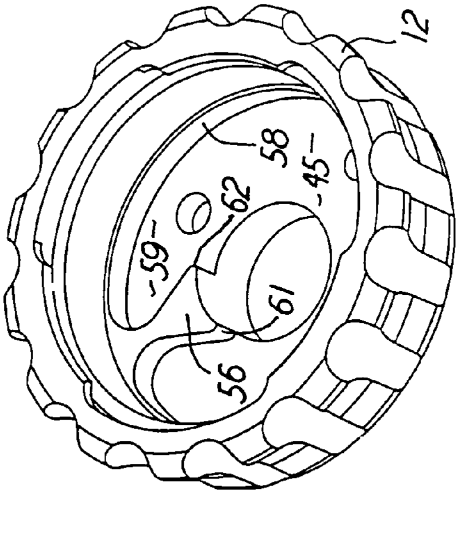
FIG. 10 is a perspective view of FIG. 8.
Figure 14:
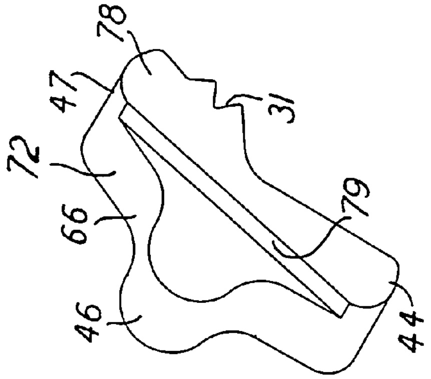
FIG. 14 is an enlarged perspective view of another embodiment of the pawl as seen in FIG. 13.
Figure 18:
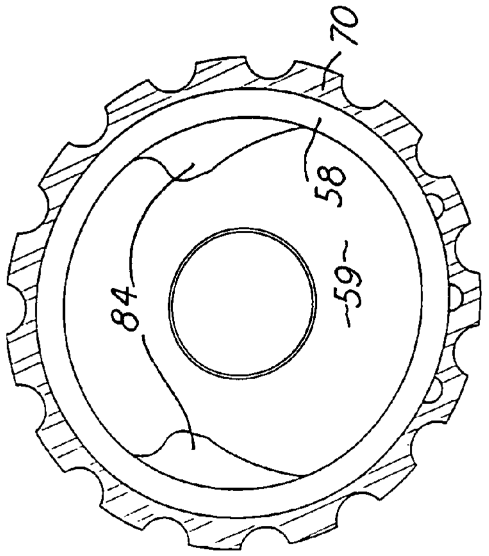
FIG. 18 is a section view of the cap of FIG. 17.
Figure 15:
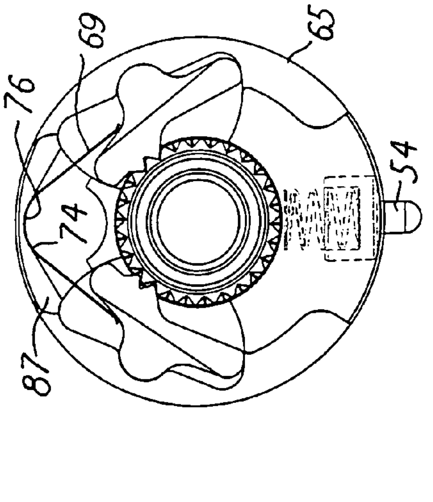
FIG. 15 is an end elevation view of FIG. 13.

The pawls have an exterior shape which complies with the shapes of the pockets 27 and 28 in all embodiments. It will be seen that the shape of the pawls is T-shaped in the end view as seen in FIGS. 7 and 15 which show the two respective embodiments of the T-shaped pawls of FIGS. 9 and 14. The pawls are confined relative to the radially direction of the axis A in a respective one of the pockets 27 and 28. The pawls each have an arcuate convex surface 43 which is in semi-circular sliding contact with the insert convex surface 38. The pawls, as shown in FIG. 7, are mirror images of each other, and they are respectively pivotally supported in the pockets 27 and 28.

The pawls have three semi-circularly shaped lobes 44, 46, and 47 that present the T-shape in the axial view, and those lobes are respectively disposed on, and can slide along, the walls 37, 38, and 39, respectively. In the pivoting action of the pawls, the lobe 46 acts as a fulcrum for the pawls which therefore pivot about the lobe 46 for gear engagement and disengagement. The center of the semi-circular configuration of the lobe 46 is shown at C, and that is also the center for the arcs 37, 38, and 39.

For the ratcheting mode, assuming clockwise driving rotation as view in FIGS. 3 and 22, the user's hand applies torque onto the handle 11, and that torque is presented at the surfaces or walls 37 and 38 of the pawl pocket 27. In turn, that force is transferred to the pawl lobes 44 and 46 and through the pawl 16 and onto the gear teeth 14 for the desired clockwise rotation of the gear 13 and thus also to the bit B. Those two circumferential torque forces on lobes 44 and 46 tend to position the pawl 16 in firm tooth-engaged contact with the gear 14. Also, the insert arcuate wall 39 is available to preclude over-movement of the pawl 16 beyond firm tooth engagement. Among the three contacts, namely, the contacts at the lobes 44 and 46 and the tooth-engaged location at 34, the pawl 16 is firmly held in tooth engagement. The lobes 44 and 46 are respectively engaged with the walls 37 and 38 by having their convex surfaces in respective sliding contact with the concave surfaces 37 and 38. Also, the pawl convex surface at the lobe 47 can be in sliding contact with the insert concave surface 39. Then, with the tooth engaged location, that forms a triangle of force transmission and stability with the lobes 44 and 46.

As best seen in FIG. 22, the pawls have recessed surfaces 48 and 49 disposed respectively between the lobes, and the surfaces 41 and 42 of the pockets 27 and 28 are disposed to be spaced from those lobes so there is no contact at those recessed surfaces even when the pawls are in the full engaged position and full disengaged position.

The cap 12 is suitably limitedly or restrictively rotatably attached to the handle on the insert 26, and the cap may be in any conventional attachment arrangement, such as the bayonet type shown where the flanges 51 interengage in the conventional manner to axially fix the cap relative to the handle but allow rotational movement of the cap to rotate slightly. Also conventionally, the cap 12 is releasably retained in any one of three rotated positions for determining the ratcheting and drive directions. Those positions are established by the post 23 which is yieldingly urged axially leftward in FIG. 1 by spring 52 to sequentially seat the post 23 into a selected one of the three holes 53 in the cap 12. That adjustment is simply a self-releasing over-ride arrangement so the cap can be rotated over the post 23 among the three positions.

Figure 19:
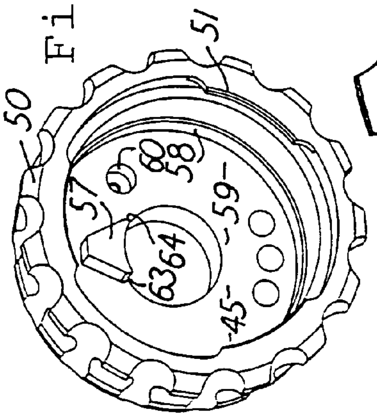
FIG. 19 is a perspective view of a cap of another embodiment of this invention.

The cap 12, and a somewhat different cap 50 of the FIG. 19 embodiment, are also attached relative to the handle for limited rotation in either direction. In those two embodiments, the rotation of the caps are limited by the pawls 16 and 17 which are axially positioned to interfere with rotation of those two caps. The pawl 16 is urged in the caps 12 and 50 by a spring 54 seen in FIG. 1. In that arrangement, the pawls 16 and 17 can be of different lengths, and the pawl 17 is shown in FIG. 2 to be longer and it fully occupies the length, or depth, of its pocket 28 and extends therebeyond, as seen in FIGS. 4 and 5. However, the pawl 16 can be of a shorter length and does not fully occupy the axial length of its pocket 27 which accommodates the spring 54, and, under the urging of the spring 54, pawl 16 extends beyond the length of the gear teeth 14 as does the pawl 17. In assembly, the caps 12 and 50 are axially moved onto the insert 26 and the caps present, in both the embodiments being mentioned, a web that is disposed between the pawls. Those webs are aligned with and force down on the spring-urged pawl 16, and, upon rotation of the caps 12 and 50 out of that alignment, the pawl 16 is released and the respective webs are rotated to a position between the pawls 16 and 17 which are then in the arcuate path of rotation of the webs to thereby preclude over-rotation of the caps relative to the handle.

Figure 21:
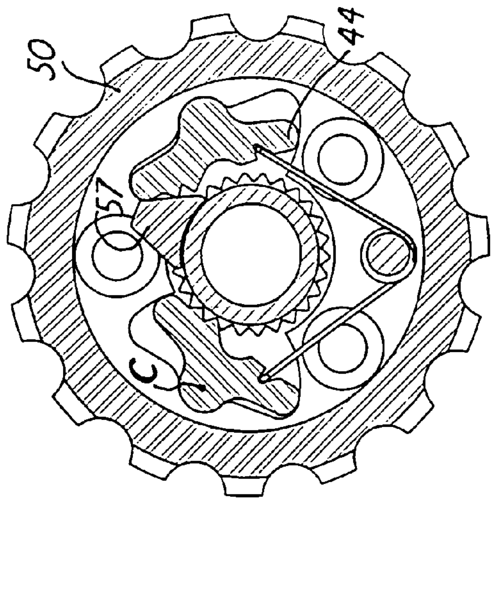
FIG. 21 is an enlarged view of FIG. 20, but with parts in positions different from those of FIG. 20.

In FIGS. 7-10, the cap 12 is shaped to present a bottom truncated pear-shaped web 56, and, in FIGS. 19-21, the cap presents a trapezoidal-shaped web 57. Those respective webs 56 and 57 extend radially inward from the cap rim 58, and that is formed by relieving the cap wall 59 of cap material, except for the webs 56 and 57. Thus there is the respective arcuate reliefs 45 along the walls 59. The web 56 extends under the arcuate lobe 47 with its respective ends 61 and 62. Likewise, the web 57 extends under the arcuate lobe 47 with it respective ends 63 and 64. Ends 61, 62, 63, and 64 are shown to present the largest width of the respective webs 56 and 57.

The webs 56 and 57 extend radially and fully to the shown and centrally and axially extending openings in the handle 11 and in the caps 12 and 50. The extent is to extend to locations between the pawls 16 and 17 and the webs are therefore positioned to pivot the pawls out of engagement with the gear teeth 14 and to restrict rotation of the cap when the respective web rotates toward either pawl which is in the rotation path of the webs, as both pawls are. FIGS. 7 and 21 show the respective pivoting and thus disengagement of the pawl 17 relative to the gear 13.

An access hole 60 in the cap 12 permits the insertion of an unshown pin into the cap and onto the pawl 16 to push the pawl 16 against the spring 54 and thereby permit the cap to be rotated beyond the pawl 16 and off the bayonet connection of the cap 12 with the handle 11 and its insert 26, for disassembly.

Figure 11:
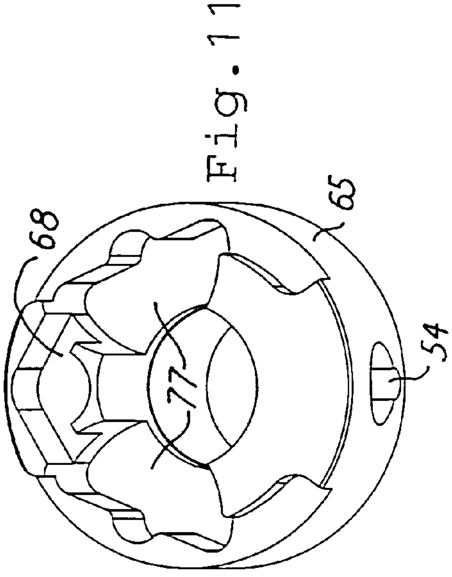
FIG. 11 is a perspective view of a handle part similar to FIG. 3, but of a different embodiment.

The embodiment of FIGS. 11-18 shows a somewhat different embodiment of the insert 26, now designated 65, and also of the cap 12, now designated 70, and the pawls, which are now pawls 66 and 67. The insert 65, as seen in FIGS. 11 and 15, has the spring-loaded pin 54 which mates with an unshown but radially extending hole in the periphery of the handle 11 for holding the insert in the handle 11. FIG. 11 shows there is a recess 68 which presents an inverted V-shape pocket 68, as it is shown. An inverted leaf spring 69 is supported in the socket 68 and it has two legs 71 which respectively contact and slide on the shown convex tops 72 of the two pawls 66 and 67 through arcuate feet 73. The spring 69 and the insert 65 have mutually engaged arcuate portions 74 and 76 for positioning and guiding the spring 69, and thus the pocket 68 is a spring-receptive pocket.

Figure 13:
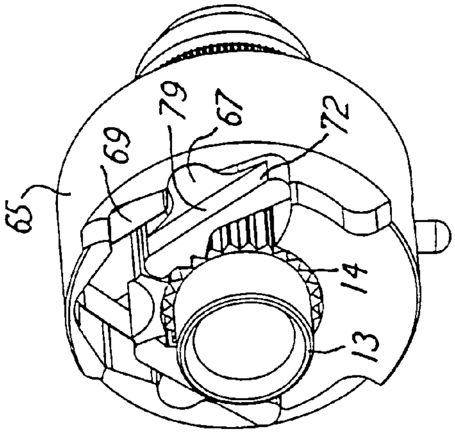
FIG. 13 is a perspective view of FIG. 12 with the cap part removed.

That embodiment of the pawls 66 and 67 has the spring legs 71 in contact with the pawl surfaces 72 to pivotally urge the pawls 66 and 67 into tooth engagement with the gear teeth 14, as in FIGS. 12, 13, and 15. Also in this embodiment, the pawls 66 and 67 are of the same length, and they extend for the full length of the gear teeth 14.

The insert 65 of FIG. 11 has two T-shaped pockets 77 in substantially the upper half of the insert, and the pawls 66 and 67 are pivotally disposed in those two pockets. The pawls 66 and 67 of FIG. 14 are also T-shaped with the three lobes mentioned. A portion 78 of the pawls 66 and 67 extends beyond the respective pocket 77, and the pawls extend for the full length of the gear teeth 14. The pawls have an extended portion of a planar surface 79. The pawls 66 and 67 have the force-transmitting action and force reaction as previously described, so they are firm in the function of transmitting the torque applied through them. They have that triangle of force application, as shown and as mentioned above.

For the embodiment of FIGS. 11-18, the cap 12 is modified to become cap 70, and it has a central recess 81 at its end wall 82. That recess is substantially circular within the cap circular rim 83. Extending radially inward from the rim 83 are two substantially diametrically opposed webs 84 which can be integral with both the wall 82 and the rim 83. The webs 84 extend radially inward on the same transverse plane relative to the axis A, and they are shown to extend only a minor distance from the rim 83.

Figure 16:
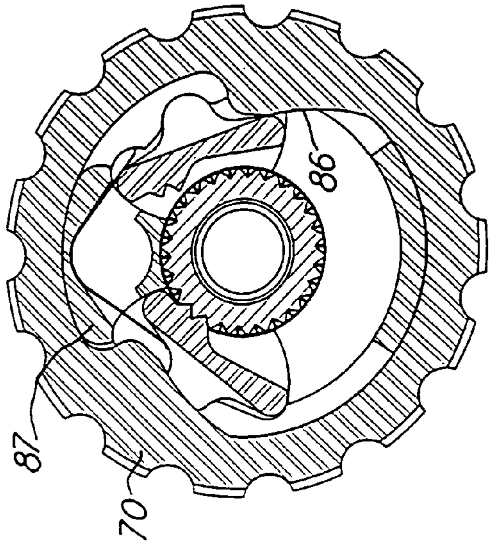
FIG. 16 is a section view like FIG. 12 but showing the cap and pawl in respective positions different from those of FIG. 12.
Figure 17:
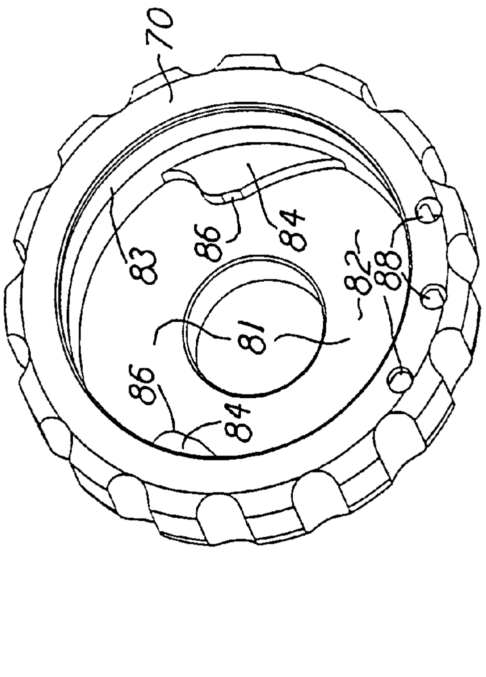
FIG. 17 is a perspective view of the cap of FIGS. 12 and 16.

The webs 84 have radially inwardly facing arcuate surfaces 86 which radially align with the pawl surface 79. As such, the surfaces 79 and 86 are cam surfaces such that when the cap 70 is rotated clockwise, such as to the position shown in FIG. 16, the surface 86 slides on the pawl surface 79 to pivot pawl 67 to the shown position of disengagement from the gear teeth 14. In that maneuver where the cap 70 has been rotated clockwise, as seen in FIG. 16, and the drive is also clockwise. So the cap is rotated in the direction that the drive is achieved, and that is the same as with the previous embodiments, so the user knows the direction for the driving mode.

To limit the amount of cap rotation, the insert 65 has a protrusion 87, which, as seen in FIG. 16, is in interference location relative to the web 84 to thereby preclude further cap rotation in the clockwise direction. The cap 70 is releasably retained in one of three selected rotated positions, that is, for neutral, which is for drive in both rotation directions, and in clockwise and counterclockwise drive directions, and those are established by three holes 88 in the cap 70. A suitable spring-loaded pin, like the pin 23 but unshown and being on the insert 65, would engage one of the three holes 88 to set the cap 70 in that selected drive position.

The method of arranging the tool is disclosed in this description, and that includes the arrangement with the pawls and the spring 54 and the cap rotation and the positioning of the web between the pawls for cap rotation restriction. It also includes the release of the cap from its restricted rotation, all as described herein.

The invention claimed is:

1. A method of arranging a ratcheting driver for rotationally driving a piece, comprising the steps of:

providing a handle with a hollow interior and a longitudinal axis and two pockets supported by said handle, placing two pivotal pawls in said pockets for orbital motion about said axis, attaching a cap relative to said handle for rotation of said cap relative to said handle and about said axis and with said cap having a web extending toward said axis and between said pawls for interference therewith to restrict the rotation of said cap and said cap having a hole extending through said cap and parallel to said axis and aligned with one of said pawls, and having said one of said pawls spring-urged parallel to said axis and aligned with said hole through which there is access to said one pawl for depressing said one pawl and thereby releasing the interference and thereby the restricted rotation of said cap.

2. The method of arranging a ratcheting driver for rotationally driving a piece, as claimed in claim 1, further comprising the step of:

initially positioning said web onto said one pawl for depressing said one pawl against said spring and then rotate and axially move said cap relative to said handle for consequent positioning said web between said pawls in assembling said cap relative to said handle.

3. A method of arranging a ratchet driver for rotationally driving a piece, comprising the steps of:

providing a combined handle and gear with a longitudinal axis and two pockets disposed by said handle, placing two pawls in respective ones of said pockets for orbital motion about said axis, attaching a cap relative to said handle for rotation of said cap relative to said handle and about said axis and with said cap having a web extending toward said axis and between said pawls for abutment with said pawls to restrict the rotation of said cap and said cap having a hole extending through said cap and providing access to one of said pawls, and having said one of said pawls spring-urged parallel to said axis and aligned with said hole through which there is access to said one pawl for depressing said one pawl and thereby releasing the abutment and the restricted rotation of said cap.

4. The method of arranging a ratcheting driver for rotationally driving a piece, as claimed in claim 3, further comprising the step of:

initially positioning said web onto said one pawl for depressing said one pawl against said spring and then rotate and axially move said cap relative to said handle for consequent positioning said web between said pawls in assembling said cap relative to said handle.

5. A method of arranging a ratchet driver for rotationally driving a piece, comprising the steps of:

providing a combined handle and a gear with a longitudinal axis and a hollow interior and with a cap rotationally disposed on said handle and having a projection thereon extending radially of said axis, positioning two pawls to be pivotally supported by said handle adjacent said gear and being orbital about said axis upon and with rotation of said handle and with each of said pawls having teeth engageable with said gear for transmitting rotation from said handle to the piece and having one of said pawls axially movable relative to said handle, positioning a spring operative on said one pawl for yieldingly axially urging said one pawl into rotational interference with said cap projection, and arranging said cap for access to said one pawl for axially moving said one pawl out of rotational interference with said cap projection and thereby release said cap from said handle.

6. The method of arranging a ratchet driver for rotationally driving a piece, as claimed in claim 5, further comprising the step of:

positioning said cap projection in axial contact with said one pawl for axially moving said one pawl and then subsequently rotating said cap to position said projection between said pawls and thereby arrange for the rotational interference.

7. In a method for arranging and operating a ratchet driver, the steps comprising:

providing a handle and a gear extending along a longitudinal axis for rotation about said axis and thereby driving a work piece, disposing two pawls in said handle and having one of said pawls movable along said axis relative to said handle, disposing a cap on said handle and being rotatable about said axis relative to said handle and with said cap having a portion in rotation interference with said one pawl for limiting rotation of said cap, providing an opening on said cap for entry through said opening for axial contact with said one pawl, and depressing said one pawl axially upon access through said opening for relieving the rotation interference and thereby provide for unrestricted rotation of said cap.

* * * * *